United States Patent Office
3,504,092
Patented Mar. 31, 1970

3,504,092
1,2-DIARYL-6-TERTIARY AMINO LOWER ALKOXY-3,4-DIHYDRO NAPHTHALENES AS HYPOCHOLESTEREMIC AGENTS
William Laszlo Bencze, New Providence, N.J., assignor to Ciba Corporation, New York, N.Y., a corporation of Delaware
No Drawing. Filed Oct. 11, 1965, Ser. No. 494,933
Int. Cl. A61k 27/00
U.S. Cl. 424—330                           2 Claims

ABSTRACT OF THE DISCLOSURE

Pharmaceutical compositions comprising the basically etherified bicyclic phenol of the formula

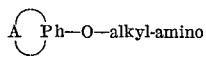

A=lower aliphatic or araliphatic radical forming with Ph a 6–7 membered ring
Ph=a 1,2-phenylene N-oxides, quaternaries or salts thereof, and a pharmaceutical excipient are hypocholesterolemic agents.

---

The present invention concerns and has for its object the provision of basically etherified bicyclic phenols and methods for their preparation.

More particularly it relates to compounds having the formula

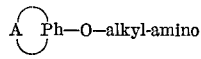

in which Ph stands for a 1.2-phenylene radical and A for a lower aliphatic or araliphatic hydrocarbon radical forming with Ph a 6 to 7 membered cycloaliphatic ring containing at most one double bond, their N-oxides, quaternaries and the salts of these compounds.

The 1,2-phenylene radical Ph, substituted by the amino-alkoxy group and being linked with the divalent hydrocarbon radical A, may be unsubstituted in the remaining three positions or substituted by one or more than one of the following groups: lower alkyl, such as methyl, ethyl, n- or i-propyl, n-, i-, sek. or tert. butyl, lower alkoxy or alkylmercapto, such as methoxy, ethoxy, n-propoxy, methyl- or ethylmercapto, halogen, such as fluoro, chloro or bromo, trifluoromethyl, nitro or amino, such as di-lower alklylamino, e.g. dimethylamino or diethylamino.

An aliphatic hydrocarbon radical A stands for lower alkylene or alkenylene having preferably 4 to 7 carbon atoms, 4 or 5 thereof are ring-carbon atoms, such as 1,4-butylene, 1,4- or 1,5-pentylene, 2-methyl-1,4-butylene, 1,4-, 1,5- or 2,5-hexylene, 2-ethyl-1,4-butylene, 2,3-dimethyl-1,4-butylene, 2-methyl-1,4- or 1,5-pentylene, 3-methyl-1,5-pentylene, 1,4-, or 1,5- or 2,5-heptylene, 2,3-dimethyl-1,4- or 1,5-pentylene, 2- or 3-methyl-2,5 hexylene or the corresponding alkenylene groups containing the double bond espectially between the first and second, but also between the second and third ring-carbon atom thereof. These radicals A are preferably unsubstituted, but may also be substituted, for example by free or esterified hydroxy, such as lower alkanoyloxy or halogen, e.g. acetoxy, propionyloxy, butyryloxy, pivalyloxy, fluoro, chloro or bromo.

An araliphatic radical A is one of the above lower alkylene or alkenylene radicals, which preferably contains one or two monocyclic, especially carbocyclic, but also heterocyclic aryl radicals, each bound one one ring-carbon atom of the aliphatic ring. A heterocyclic aryl radical is preferably a monoaza or thiacyclic radical, such as 2-, 3- or 4-pyridyl, 2- or 3-thienyl. These aryl radicals may be unsubstituted or substituted as shown for the 1,2-phenylene radical Ph.

In the amino-alkoxy radical substituting Ph, the alkylene chain separates the amino group from the oxygen atom by at least 2 carbon atoms and stands preferably for 1,2-ethylene, 1,2- or 1,3-propylene, but also for one of the lower alkylene groups shown for A. Its amino group may be primary, secondary or preferably tertiary, such as mono- or di-lower alkylamino, e.g. methylamino, dimethylamino, N-methyl-N-ethylamino, ethylamino, diethylamino, n-propylamino, di-n-propylamino, isopropylamino, di-isopropylamino, n-butylamino or di-n-butylamino, cycloalkylamino or N-cycloalkyl-N-lower alkylamino, in which cycloalkyl has preferably from five to six carbon ring atoms, e.g. cyclopentylamino, cyclohexylamino, N - cyclopentyl - N-methyl-amino, N-cyclohexy-N-methyl-amino or N-cyclohexyl-N-ethyl-amino, phenyl-lower alkyl-amino or N-lower alkyl-N-phenyl-lower alkyl-amino, e.g. benzylamino, N-benzyl-N-methyl-amino, N-benzyl-N-ethyl-amona, N-ethyl-N-(1-phenyl-ethyl) - amino or N - methyl-N-(2-phenyl-ethyl)-amino, hydroxy-lower alkyl-amino, N-(hydroxy-lower alkyl)-N-lower alkyl-amino or di-(hydroxy-lower alkyl)-amino, e.g. 2-hydroxyethyl-amino, N-(2-hydroxyethyl)-N-methylamino or di-(2-hydroxyethyl)-amino, lower alkyleneimino or mono-aza-, oxa- or thia-alkyleneimino, e.g. pyrrolidino, 2-methyl-pyrrolidino, piperidino, 2- or 4-methylpiperidino, 3-hydroxy-piperidino, 3-acetoxy-piperidino, 3- hydroxymethyl-piperidino, 1,6-hexyleneimino or 1,7-heptyleneimino, piperazino, 4-methyl or ethyl-piperazino, 4-hydroxyethyl- or 4-acetoxyethyl-piperazino, 3-aza-1,6-hexyleneimino, 3-methyl-3-aza-1,6-hexyleneimino, 4 - aza-1,7-heptyleneimino, 4-methyl-4-aza-1,7-heptyleneimino, morpholino, 3-methyl-morpholino or thiamorpholino.

In the amino-alkoxy group, the alkyl portion, either partially or in toto, may also form part of a heterocyclic ring system, of which the amino group is a ring member and is separated from the oxygen atom by at least two carbon atoms. Such amino-alkoxy groups are, for example, piperidyl-(2) or (3)-methoxy, piperidyl-(4)-oxy, pyrrollidyl-(3)-oxy, 1-methyl-piperidyl-(2) or (3)-methoxy, 1-ethyl-piperidyl-(4)-oxy, 1-methyl-pyrrolidyl-(3)-oxy or imidazolinyl-(2)-methoxy.

The compounds of the invention exhibit valuable pharmacological properties. Apart from estrogenic and antiestrongenic effects they show primarily hypocholesterolemic effects, as can be demonstrated in animal tests using, for example, rats as test objects, which are either on a normal or high cholesterol diet. The new compounds are, therefore, useful as antiestrogenic and especially hypocholesterolemic agents, preferably in the treatmetn of arteriorsclerosis. Furthermore, they can be used as intermediates for the preparation of other useful products, particularly of pharmacologically active compounds.

Particularly valuable are compounds of the formula

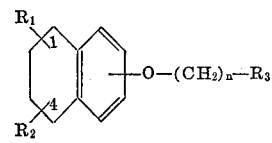

in which each of $R_1$ and $R_2$ stands for hydrogen, phenyl, (lower alkyl)-phenyl, (lower alkoxy-phenyl, (halogeno)-phenyl, (trifluoromethyl)-phenyl, (di-lower alkylamino)-phenyl, pyridyl, (lower alkyl)-pyridyl, thienyl or (lower alkyl)-thienyl, $R_3$ for amino, lower alkylamino, di-lower alkylamino, lower alkyleneimino, mono- aza-, oxa- or thia-lower alkyleneimino, n for the integer 2 or 3, their 1-dehydro and 1-hydroxy derivatives and acid addition salts of these compounds.

Especially mentioned is the 1,2-diphenyl-6-(2-diethyl-amino-ethoxy) - 3,4 - dihydro - naphthalene which, when given, for example, orally in the form of its citrate at doses between about 1 and 20 mg./kg./day, shows an outstanding hypocholesterolemic effect.

The compounds of the invention are prepared according to methods in themselves known. For example, they are obtained by (a) converting in a compound of the formula

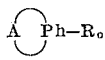

in which $R_o$ is a substituent capable of being converted into amino-alkoxy, the substituent $R_o$ into said amino-alkoxy group or (b) reducing a compound of the formula

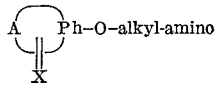

in which X stands for oxo or thiono and, if desired, converting any compound obtained into another disclosed compound.

In the starting material mentioned under (a) $R_o$ may be converted into amino-alkoxy in one step or in stages. A particularly suitable group $R_o$ is hydroxy. Usually such phenol, or preferably a salt thereof, is reacted with an amino-alkanol or a reactive ester thereof, especially that of a strong mineral acid, such as a hydrohalic acid, e.g. hydrochloric or hydrobromic acid, or that of a strong sulfonic acid, such as a lower alkane or benzene sulfonic acid, e.g. methane or ethane benzene or p-toluene sulfonic acid.

Another group $R_o$ is that of the formula —O—CO—Y, in which Y represents halogeno or etherified hydroxy. The group Y is particularly lower alkoxy as well as phenoxy. Upon reacting a starting material of which Ph is substituted by such group $R_o$, with an amino-alkanol, the desired compound can also be formed. The reaction is preferably carried out between about 180° and 200°.

A further group $R_o$ is a reactive esterified hydroxy-alkoxy group. Here the reactive esterified hydroxy group is primarily halogeno, particularly chloro; it may also be an organic sulfonyloxy group, such as one of those mentioned above. A starting material in which $R_o$ stands for reactive esterified hydroxy-alkoxy is reacted with ammonia or a corresponding primary or secondary amine, to yield the desired compounds.

In the starting material mentioned under (b) the group X preferably substitutes the ring carbon atom of A which is linked with the 1,2-phenylene radical Ph. The reduction of an oxo group X may be carried out by conventional methods, for example with catalytically activated hydrogen, with a complex light metal aluminum or borohydride, e.g. lithium aluminum hydride or sodium borohydride, or an organic metal compound, such as a corresponding Grignard compound. With the use of the latter the group A is converted into another group A depending on the starting material and the Grignard reagent chosen. A thiono group X may be reduced, for example with freshly prepared Raney nickel.

The above process is carried out according to methods known per se, in the presence or absence of diluents, preferably such as are inert to the reagents and are solvents thereof, of catalysts, condensing, salifying or neutralizing agents and/or inert atmospheres, at low temperatures, room temperature or advantageously elevated temperatures, at atmospheric or super-atmospheric pressure.

As noted above, the phenol in reaction (a) is preferably used in the form of a salt thereof. Such salt, for example, a metal salt, particularly an alkali metal, e.g. sodium or potassium salt, is formed, for example, by treatment of the phenol with a metal salt-forming reagent, such as an alkali metal hydride or amide, e.g. sodium hydride, or potassium amide or an alkali metal lower alkoxide, e.g. sodium or potassium methoxide, ethoxide or tertiary butoxide, an alkali metal compound of a hydrocarbon, e.g. butyl lithium or phenyl sodium. In case the phenol is reacted with the amino-alkanol, for example a carbonate may be used as condensing agent. The latter is, for example, a diaryl carbonate, e.g. diphenyl carbonate or, more particularly, a di-lower alkyl carbonate, e.g. dimethyl carbonate, ethyl methyl carbonate, diethyl carbonate or dibutyl carbonate. The reaction is carried out at an elevated temperature, for example, between about 100° and 210° and, if desired, in the presence of a transesterification catalyst enhancing the rate of the reaction, e.g. sodium or potassium, sodium or potassium carbonate or sodium aluminate, a metal lower alkoxide, e.g. sodium ethoxide or titanium butoxide. The reaction is usually performed in the absence of an additional diluent. Said transesterification agents may also be used with starting materials in which $R_o$ stands for O—CO—Y. Neutralizing agents are advantageously used together with starting materials in which $R_o$ stands for a reactive esterified hydroxy-alkoxy group. They are, for example, alkali metal carbonates or bicarbonates.

A resulting compound may be converted into another disclosed compound according to standard methods. For example, a hydroxy group present in A may be esterified, for example with the use of a reactive derivative of a lower alkanoic acid, such as a halide or anhydride thereof, or with a halogenating agent, such as thionyl chloride or phosphorous trichloride. Said hydroxy group present in A, may also be split off, whereby a double bond is formed. This is easily performed in the case of a tertiary hydroxy group, for example by pyrolysis or the use of an acid, such as hydrochloric, sulfuric or phosphoric acid. An unsaturated compound obtained, i.e. such containing a double bond in the ring-moiety A, may be reduced, for example with nascent or catalytically activated hydrogen, such as zinc in the presence of an acid, sodium amalgam in the presence of moist ether or hydrogen in the presence of a platinum, palladium or nickel catalyst.

A tertiary amine obtained may be converted into the N-oxide, for example, by treating the free base with a suitable N-oxidizing reagent, such as hydrogen peroxide, ozone or persulfuric acid, and in the presence of a suitable inert diluent. Quaternary ammonium compounds of this invention are obtained, for example, by reacting the base with the reactive ester of an alcohol and a strong acid, for example, with a lower alkyl halide, di-lower alkyl sulfate, lower alkyl alkane- or benzene sulfonate or phenyl-lower alkyl halide.

The compounds of the invention are obtained in the free form or in the form of their salts, depending on the conditions under which the process is carried out; the salts are also included in the present invention. These are preferably derived from therapeutically useful inorganic or organic carboxylic or sulfonic auids, such as hydrochloric, hydrobromic, sulfuric or phosphoric acid, acetic, propionic, pivalic, glycolic, lactic, malonic, succinic, maleic, hydroxymaleic, malic, tartaric, citric, benzoic, salicylic, 2-acetoxybenzoic, nicotinic or isonicotinic acid, methane sulfonic, ethane sulfonic, ethane 1,2-disulfonic, 2-hydroxyethane sulfonic, p-toluene sulfonic or naphthalene 2-sulfonic acid. Other salts may be useful for purification or characterization purposes. Such salts are, for example, those with acidic organic nitro compounds, e.g. picric, picrolonic or flavianic acid or metal complex acids, e.g. phosphotungstic, phosphomolybdic, chloroplatinic or Reinecke acid. The conversion of the free compounds into the salts or of the salts into the free compounds or into other salts is achieved according to standard procedures, for example with the use of acidic or alkaline agents or ion exchangers.

The invention further includes any variant of the present process in which an intermediate obtainable at any stage of the process is used as starting material and the remaining steps are carried out, or the process is discontinued at any stage thereof, or in which the starting materials are formed under the reaction conditions, or the reaction components are used in the form of their salts. Mainly, those starting materials should be used which lead to those products mentioned in the beginning as preferred embodiments of the invention.

The starting materials are known or, if they are new, may be prepared by methods in themselves known. Several starting materials are described in copending applications Ser. Nos. 328,059, filed Dec. 4, 1963 now U.S. Patent No. 3,238,218; 411,632, filed Nov. 16, 1964 and 481,954, filed Aug. 23, 1965, both now abandoned, or may be prepared analogous to the procedures described therein.

The compounds of the invention as well as the corresponding starting materials may be in the form of pure geometric or optical isomers or in the form of mixtures thereof. Such mixtures may be separated according to known methods, diastereoisomers or cis-trans isomers, for example, by fractional crystallization or chromatography and racemates by conversion into appropriate diastereoisomers.

The compounds of the invention may be used in the form or pharmaceutical compositions which are a further object of the present invention. They contain said compounds in admixture with a pharmaceutically acceptable, organic or inorganic, solid or liquid carrier, which usually represents the major portion by weight of such compositions. The compositions are in solid form, for example, as capsules, tablets or dragees, in liquid form, for example as solutions or suspensions. Suitable carrier materials are, for example, starches, e.g. corn, wheat or rice starch, sugars, e.g. lactose, glucose or sucrose, stearic acid or salts thereof, e.g. magnesium or calcium stearate, stearyl alcohol, talc, gums, acacia, tragacanth, propylene glycol or polyalkylene glycols. The quantity and the nature of the carrier ingredients can vary widely and depend, inter alia, upon the desired physical appearance or size of the composition or method of manufacture. If necessary, the compositions may contain other auxiliary substances, such as preserving, stabilizing, wetting or emulsifying agents, salts for varying the osmotic pressure or buffers. They may also contain, in combination, other pharmacologically useful substances.

The following examples illustrate the invention, temperatures are given in degrees centigrade and all parts wherever given are parts by weight.

EXAMPLE 1

To the stirred solution containing 1.7 g. 1,2-diphenyl-6-hydroxy-3,4-dihydro-naphthalene in 15 ml. dimethylformamide, cooled in an ice bath, 0.274 g. of a 56% sodium hydride suspension in mineral oil are added in portions. After the hydrogen evolution has ceased 0.773 g. 2-dimethylamino-ethyl chloride in 15 ml. toluene are slowly added and the mixture is stirred at room temperature for 5 hours. It is then filtered, the residue washed with diethyl ether, the filtrate evaporated under reduced pressure, the residue mixed with water and extracted with diethyl ether. The organic layer is shaken with 2N hydrochloric acid, the aqueous layer neutralized with ammonia and extracted with diethyl ether. The extract is washed with brine, dried, filtered and evaporated in vacuo to yield a brown oil. This is dissolved in methyl-ethyl-ketone and the solution of 2.3 g. anhydrous citric acid in boiling methyl-ethylketone is added. The crystals formed are filtered off and recrystallized from methyl-ethylketone-diethyl ether to yield the 1,2-diphenyl-6-(2-diethylamino-ethoxy)-3,4-dihydro-naphthalene citrate of the formula

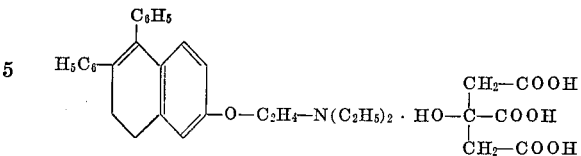

melting at 164–166°.

The starting material is prepared as follows: To the Grignard reagent, prepared from 4.8 g. magnesium, 31.4 g. bromobenzene, 300 ml. diethyl ether and a few drops methyl iodide and cooled in an ice bath, 25.2 g. 2-phenyl-6-methoxy-tetralone in 300 ml. benzene are added slowly and the mixture is refluxed for 5 hours. Hereupon it is poured onto ice and concentrated hydrochloric acid, extracted with diethyl ether, the extract washed with water and brine, dried, filtered, and evaporated in vacuo. The residue is refluxed for one hour in 300 ml. concentrated hydrochloric acid, which is then diluted with water, extracted with diethyl ether, the extract washed with water and brine, dried, filtered and evaporated to yield the 1,2 - diphenyl-6-methoxy-3,4-dihydronaphthalene which melts after recrystallization from aqueous ethanol at 98–101°.

4.0 g. thereof are heated in a melt of pyridine hydrochloride for 30 minutes at 250°. The melt was prepared by evaporating the mixture of 39.2 ml. concentrated hydrochloric acid and 35.8 g. pyridine until the vapor reached a temperature of about 250°. The mixture is then poured onto ice, extracted with diethyl ether, the extract washed with water and brine, dried, filtered and evaporated in vacuo. The residual orange oil is distilled and the fraction boiling at 185–205°/0.2 ml. collected; it represents the 1,2-diphenyl-6-hydroxy-3,4-dihydro-naphthalene.

EXAMPLE 2

To the Grignard reagent, prepared from 0.47 g. magnesium and 3.4 g. 4-methyl-bromobenzene in 25 ml. diethyl ether, 3.7 g. 2-(4-chloro-phenyl)-6-(2-diethylamino-ethoxy)-tetralone in 25 ml. benzene are added dropwise with stirring at 10°. The mixture is stirred for 30 minutes at room temperature, refluxed for 2 hours and allowed to stand overnight at room temperature. The next day it is refluxed for 3 additional hours, then cooled in an ice bath and concentrated, aqueous ammonium chloride solution is added dropwise while stirring. The mixture is extracted with ethyl acetate, the organic layer washed with brine, dried, filtered, evaporated under reduced pressure and the residue recrystallized from diethyl ether-pentane to yield the 1-hydroxy-1-(4-methyl-phenyl)-2-(4-chloro-phenyl)-6-(2-diethylamino-ethoxy)-1,2,3,4-tetrahydronaphthalene of the formula

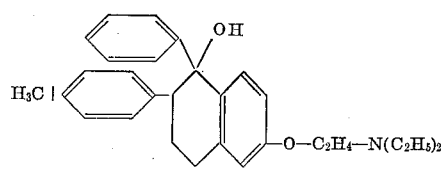

melting at 122–124°. This compound is dissolved in benzene, chromatographed on 30 g. alumina (neutral, activity III) and the benzene eluate recrystallized from aqueous ethanol to yield a somewhat purer product melting at 127–128°.

The starting material is prepared as follows: 16.0 g. 2-(4-chloro-phenyl)-6-methoxy-tetralone are refluxed in the mixture of 220 ml. acetic acid and 220 ml. 48% hydrobromic acid for 6 hours. It is then evaporated in vacuo, the residue mixed with water, the crystals formed filtered off and dried to yield the 2-(4-chloro-phenyl)-6-hydroxy-tetralone melting at 187–196°; it is used without further purification.

14.5 g. thereof are dissolved in 32 ml. dimethylformamide and, while stirring, 2.42 g. of a 53% suspension of sodium hydride in mineral oil are added in small portions. After the hydrogen evolution has ceased, the reaction mixture is cooled and 6.97 g. 2-diethylamino-ethyl chloride in 31.2 ml. toluene are added. The whole is refluxed for 3 hours, allowed to cool to room temperature, filtered, the residue washed with benzene and diethyl ether, the filtrate evaporated in vacuo, the residue mixed with water and extracted with diethyl ether. The organic layer is shaken with 2N hydrochloric acid, the aqueous layer made basic with ammonia, extracted with diethyl ether, the extract washed with water and brine, dried, filtered and evaporated. The residual oil crystallizes upon cooling and is recrystallized from aqueous ethanol to yield the 2-(4-chloro-phenyl)-6-(2-diethylamino-ethoxy)-tetralone melting at 72–73°.

EXAMPLE 3

In the analogous manner described in the previous examples the following compounds can be prepared by using the equivalent amounts of the corresponding starting materials:

5-(2-dimethylamino-ethoxy)-1,2,3,4-tetrahydro-naphthalene, 2-(4-pyridyl)-6-(3-dimethylamino-propoxy)1,2,3,4-tetrahydro-naphthalene, 1-(4-methoxy-phenyl)-2-phenyl-6-(2-pyrrolidino-ethoxy)-1,2,3,4-tetrahydro-naphthalene, 1,2-diphenyl-6-[2-(4-methyl-piperazino)-ethoxy]-benzsuberane, 1-(4-trifluoromethyl-phenyl)-2-(4-dimethylamino-phenyl)-7-(2-morpholino-ethoxy)-3,4-dihydro-naphthalene, 1-(3,5-dimethoxy-phenyl)-2-(3-thienyl)-6-(2-tert. butyl-amino-ethoxy)-3,4-dihydronaphthalene, 1-hydroxy-1-phenyl-2-(4-methyl-phenyl)-6-(4-amino-butoxy)1,2,3,4-tetrahydronaphthalene, 3-(4-chloro-phenyl)-6-(2-diethylamino-ethoxy)-benzsuberane or 1-phenyl-2-methyl-2-(4-methylmercapto-phenyl)-8-(3-piperidinopropoxy)-1,2,3,4-tetrahydronaphthalene.

EXAMPLE 4

Preparation of 160,000 tablets each containing 0.025 g. of the active ingredient.

| Ingredients: | G. |
|---|---|
| 1,2-diphenyl-6-(2-diethylamino-ethoxy)-3,4-dihydronaphthalene citrate | 4,000.0 |
| Lactose | 28,289.0 |
| Corn starch | 3,410.0 |
| Confectioners sugar | 2,800.0 |
| Colloidal silica | 1,000.0 |
| Stearic acid powder | 400.0 |
| Calcium stearate | 100.0 |
| Color FD & C yellow No. 5 | 1.0 |
| Purified water, q.s. | |

PROCEDURE

The citrate, the lactose, 2,500.0 g. of the corn starch, the confectioners sugar and the colloidal silica are passed through a No. 16 screen into a mixer and blended at low speed for twenty minutes. The remainder of the corn starch is suspended in a cold solution of the color in 1,000 ml. of purified water, and a paste is formed by gradually adding 4,000 ml. of boiling purified water. The mixed powders are granulated with the above paste, using additional water as required.

The resulting moist mass is passed through a mill, using a No. 4A screen, placed on trays and dried at 38° C. until the moisture content is between 2 percent and 3 percent. The granules are broken on a mill through a No. 16 screen, and treated with the stearic acid and the calcium stearate, both screened through a No. 20 screen. After mixing for twenty minutes, the granulation is compressed into tablets, each weighing 0.25 g., using $^{11}\!/_{32}$ inch dies, standard concave punches, uppers bisected, lowers monogrammed.

What is claimed is:

1. A hypocholesterolemic composition comprising an effect amount of a compound having the formula

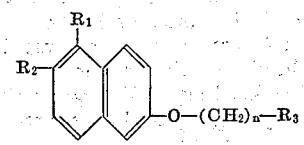

in which each of $R_1$ and $R_2$ stands for a member selected from the group consisting of phenyl, (lower alkyl)-phenyl, (lower alkoxy)-phenyl, (halogeno)-phenyl, (trifluoromethyl)-phenyl, (di-lower alkylamino)-phenyl, pyridyl, (lower alkyl)-pyridyl, thienyl and (lower alkyl)-thienyl, wherein lower alkyl or lower alkoxy have 1 to 4 carbon atoms, $R_3$ for a member selected from the group consisting of di-lower alkylamino having a total of 2 to 8 carbon atoms, lower alkyleneimino having 4 to 7 carbon atoms, pyrrolidino, 2-methyl-pyrrolidino, piperidino, 2- or 4-methyl-piperidino, 3-hydroxy piperidino, 3-acetoxy-piperidino, 3-hydroxymethyl - piperidino, 1,6-hexyleneimino or 1,7-heptyleneimino, piperazino, 4-methyl or ethyl-piperazino, 4-hydroxy ethyl or 4-acetoxyethyl-piperazino, 3-aza-1, 6-hexyleneimino, 3-methyl-3-aza-1, 6-hexyleneimino, 4-aza-1, 7-heptyleneimino, 4-methyl-4-aza-1,7-heptyleneimino, morpholino, 3-methylmorpholino or thiamorpholino, $n$ for an integer from 2 to 3 or a therapeutically acceptable acid addition salt thereof and a pharmaceutical excipient therefor.

2. A composition according to claim 1, wherein the compound is 1,2-diphenyl-6-(2-dimethylaminoethoxy)-3,4-dihydro-naphthalene or a therapeutically acceptable acid addition salt thereof.

No references cited.

ALBERT T. MEYERS, Primary Examiner

S. J. FRIEDMAN, Assistant Examiner

U.S. Cl. X.R.

424—274, 275, 263, 266, 267, 244, 245, 246, 247